United States Patent [19]
Watanabe et al.

[11] Patent Number: 5,533,160
[45] Date of Patent: Jul. 2, 1996

[54] APPARATUS FOR SPLICING OPTICAL FIBERS

[75] Inventors: Tetsuaki Watanabe; Mikio Kobayashi, both of Yokohama; Shikou Kodama, Kobe, all of Japan

[73] Assignee: Sumitomo Electric Industries, Ltd., Osaka, Japan

[21] Appl. No.: 380,746

[22] Filed: Jan. 31, 1995

[30] Foreign Application Priority Data

Mar. 29, 1994 [JP] Japan .................................. 6-059054

[51] Int. Cl.⁶ ................................................ G02B 6/255
[52] U.S. Cl. ................ 385/96; 219/121.45; 219/121.58; 385/147
[58] Field of Search ...................... 385/95–99, 134–136, 385/147; 219/121.13, 121.28, 121.31, 121.45, 121.58

[56] References Cited

U.S. PATENT DOCUMENTS

| | | | |
|---|---|---|---|
| 4,248,499 | 2/1981 | Liertz et al. | 385/98 |
| 4,274,707 | 6/1981 | Pacey et al. | 385/96 X |
| 4,506,947 | 3/1985 | Tatekura et al. | 385/97 |
| 4,735,481 | 4/1988 | Lukas et al. | 385/96 X |
| 4,914,797 | 4/1990 | Tsuchida et al. | 385/96 X |
| 5,218,184 | 6/1993 | Hakoun et al. | 385/97 X |
| 5,249,247 | 9/1993 | Whitesmith | 385/96 |
| 5,386,490 | 1/1995 | Pan et al. | 385/134 |

*Primary Examiner*—John D. Lee
*Attorney, Agent, or Firm*—Cushman Darby & Cushman

[57] ABSTRACT

This apparatus comprises: an installation table for arranging the optical fibers thereon in order to splice the optical fibers; a cover member for covering said installation table; and a gripping mechanism, attached to said cover member, for gripping a storing component that stores the optical fibers.

23 Claims, 16 Drawing Sheets

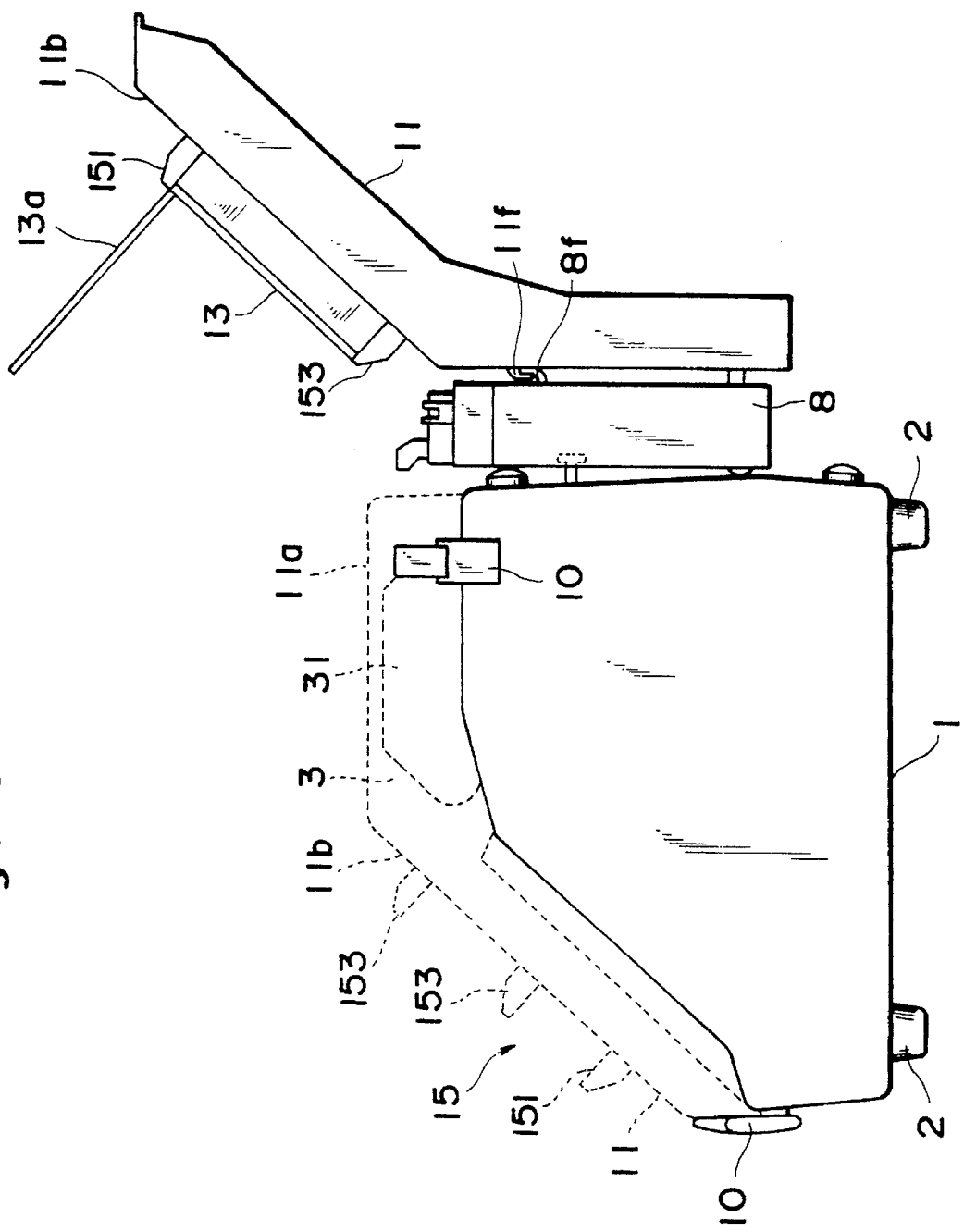

1

APPARATUS FOR SPLICING OPTICAL FIBERS

BACKGROUND OF THE INVENTION

1. Field of the Invention

The present invention relates to an apparatus for splicing a pair of opposing optical fibers and, more particularly, to an apparatus for melting the fibers to splice the fibers.

2. Related Background Art

As a method of permanently splicing a pair of opposing optical fibers by causing the axes of the optical fibers to coincide with each other, a fusing method is employed because it does not require advanced skills, has a high long-term reliability, and the like. An optical fiber fusion splicer is suitable for practicing this fusing method.

SUMMARY OF THE INVENTION

An apparatus according to the present invention is an improvement over an apparatus which has long been studied by the present inventors.

This apparatus for splicing optical fibers comprises:

(a) an installation table for arranging the optical fibers thereon in order to splice the optical fibers;

(b) a cover member for covering the installation table; and (c) a gripping mechanism, attached to the cover member, for gripping a storing component (tray) that stores the optical fibers.

When the splicing apparatus is not in use, the installation table is covered with and protected by the cover member.

When the apparatus is in use, the cover member is moved relative to a housing and the installation table arranged in the housing. When the cover member is moved, the installation table can place optical fibers thereon. The gripping mechanism can grip the tray. Optical fibers are placed on the installation table, and are fusion-spliced. Since the tray is gripped by the gripping mechanism, the fusion-spliced optical fibers are stored in the tray.

This apparatus comprises:

(d) an image sensor for observing the optical fibers placed on the installation table;

(e) a housing for storing the image sensor; and (f) a display for displaying an output from the image sensor.

This apparatus further comprises:

(g) a heater mounted to the housing such that the installation table is arranged between the display and the heater. The operator splices the optical fibers by using the installation table, fits a reinforcing tube on the fusion-spliced portion of the optical fibers, and heats the reinforcing tube. Since the installation table is arranged between the display and the heater, a series of operations consisting of observation of the optical fibers displayed on the display, splicing of the optical fibers, and heating of the reinforcing tube can be performed by the operator very easily.

In particular, when the cover member is mounted to the heater, the efficiency of the operation of splicing the optical fibers is remarkably increased. The optical fibers heated by the heater are arranged as they are in the tray gripped by the gripping mechanism mounted to the cover member.

When no heater is mounted to a housing, a cover member is directly mounted to the housing. The apparatus has a projection member. The cover member has a hole or through hole to fit on the projection member. The projection member is a bolt. The through hole has such a size that a portion of the bolt can be fitted in it. This portion of the bolt is the head of the bolt. The cover member and the heater may be connected to each other with hooks that engage with each other.

The heater has a rubber member which is brought into contact with the cover member to support it when one portion of the bolt is fitted in the through hole of the cover member.

The housing has first and second surfaces opposing each other. The heater is mounted to the second surface of the housing.

This apparatus further comprises:

(i) a handle mounted to the first surface of the housing; and (j) a rubber member mounted to the second surface of the housing.

Therefore, when the heater is removed from the housing, if the handle is held, the rubber member is brought into contact with a place where this apparatus is installed, thereby protecting this apparatus. The installation place is a road, ground, floor, or the like. When the heater is mounted to the housing, the rubber member is brought into contact with the heater to apply a stress to it, thereby firmly supporting the heater.

The gripping mechanism comprises:

a case having a guide groove in an inner surface thereof;

a slide member arranged in the case and having a through hole;

a shaft extending through the through hole of the slide member and slidable in the guide groove; and a first pawl member mounted to the slide member. Therefore, the first pawl member moves along the guide groove. The first pawl member moves in accordance with the size of the tray and grips the tray.

This gripping mechanism has a second pawl member connected to the slide member through a spring. The tray is gripped by the first and second pawl members. Since the first and second pawl members are pulled by each other through the spring, the tray is firmly held by these pawl members. The first and second pawl members are arranged in the case.

The housing has an installation surface in the vicinity where the installation table is arranged, a bottom surface opposite to the installation surface, a front surface intersecting the installation surface at an obtuse angle, and a rear surface opposite to the front surface.

The display is mounted to the front surface of the housing. This apparatus is arranged such that its installation surface is substantially parallel to the horizontal plane. Since the front surface is inclined with respect to the horizontal plane, when observing the display, the operator can easily observe it. The cover member is bent along the installation surface and the front surface. Thus, when the installation table and the display are covered with the cover member, they are protected by the cover member. Since the cover member is bent along the installation surface and the front surface, when the cover member is mounted to the rear surface side of the apparatus, the cover member has a gripping surface intersecting the installation surface at an obtuse angle. The gripping mechanism is mounted to the gripping surface. Thus, the optical fibers arranged on the installation table are easily moved into the tray arranged in the gripping mechanism.

The sequence of an operation employing this apparatus will be described.

In fusion-splicing a pair of opposing optical fibers, the operator sets the pair of optical fibers in a fusion splicing mechanism having the installation table, and appropriately depresses a plurality of operation buttons of the fusion splicer. The fusion splicer adjusts the gap between the end faces of the pair of optical fibers, inspects the end faces of the pair of optical fibers, and aligns the cores of the pair of optical fibers. The pair of optical fibers are fusion-spliced by the fusion splicing mechanism.

Thereafter, the fusion-spliced portion of the optical fibers is inspected. If the fusion-spliced pair of the optical fibers has a low splice loss and a good outer appearance, a reinforcing tube mainly comprising a heat-shrinkable tube, which is applied on the fusion-spliced optical fibers in advance, is heated to shrink on the fusion-spliced portion to protect the optical fibers, thereby ending the fusion splicing operation.

A portion of the fusion-spliced optical fiber near the fusion-spliced portion is coiled in a loop by a plurality of turns as an excessive processing portion, and the excessive projecting portion including the fusion-spliced portion is stored and protected in the storing tray.

It is an object of the present invention to provide an optical fiber splicing apparatus capable of decreasing the storing space while simplifying the storing/managing operation.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 16 is a side view of the apparatus according to an embodiment in which a radiator and a cover member are connected through hooks that engage with each other.

DESCRIPTION OF THE PREFERRED EMBODIMENT

Figure 1:
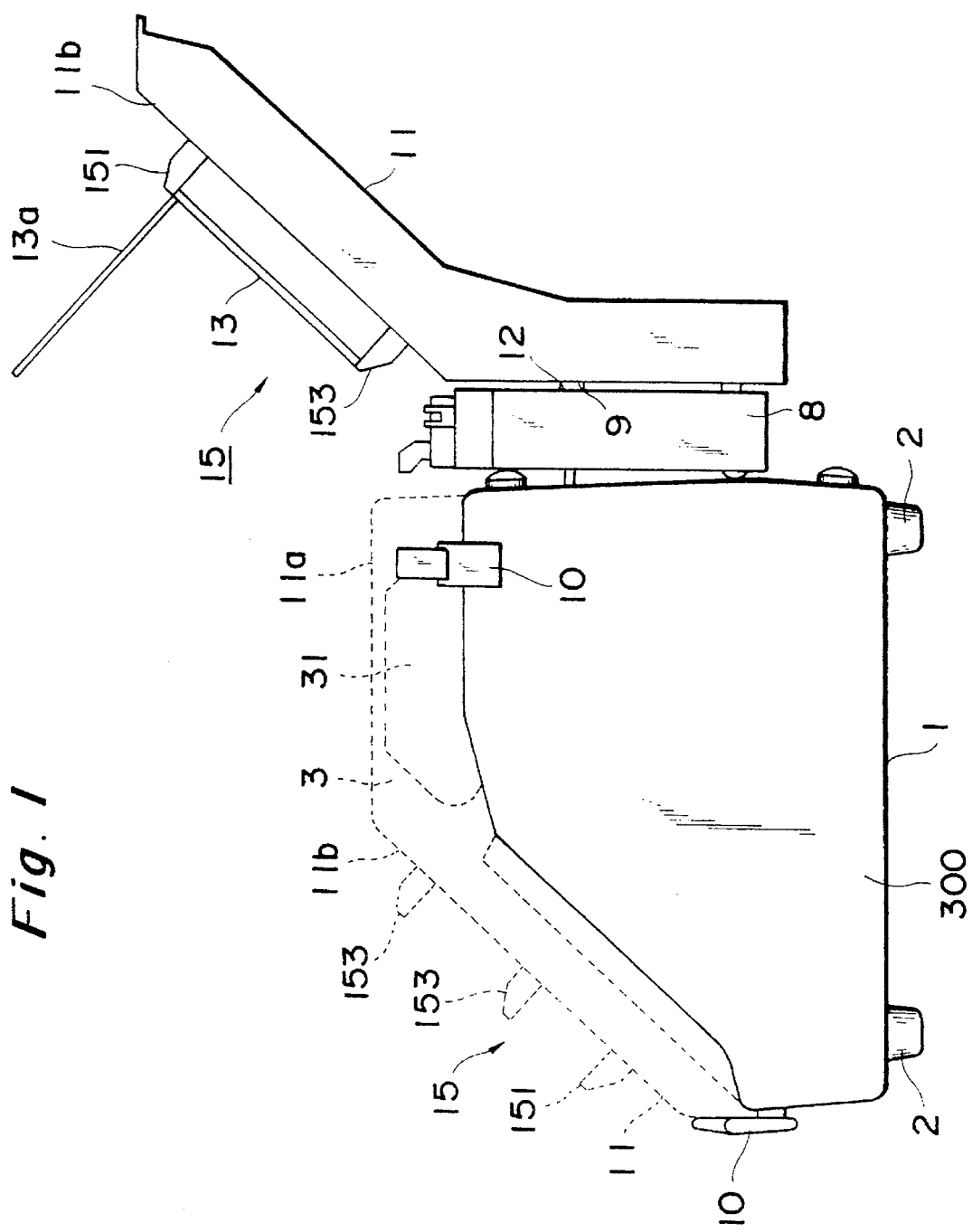
FIG. 1 is an explanatory side view showing an optical fiber fusion splicer according to an embodiment of the present invention.

In an optical fiber fusion splicer 1 according to the present invention, a retractable holding means or gripping mechanism 15 that holds a storing tray 13 is provided to a cover or cover member 11 of the fusion splicer 1. In fusion-splicing optical fibers 7, the cover 11 is supported by a heater 8 on the rear surface of the fusion splicer 1.

Figure 2:
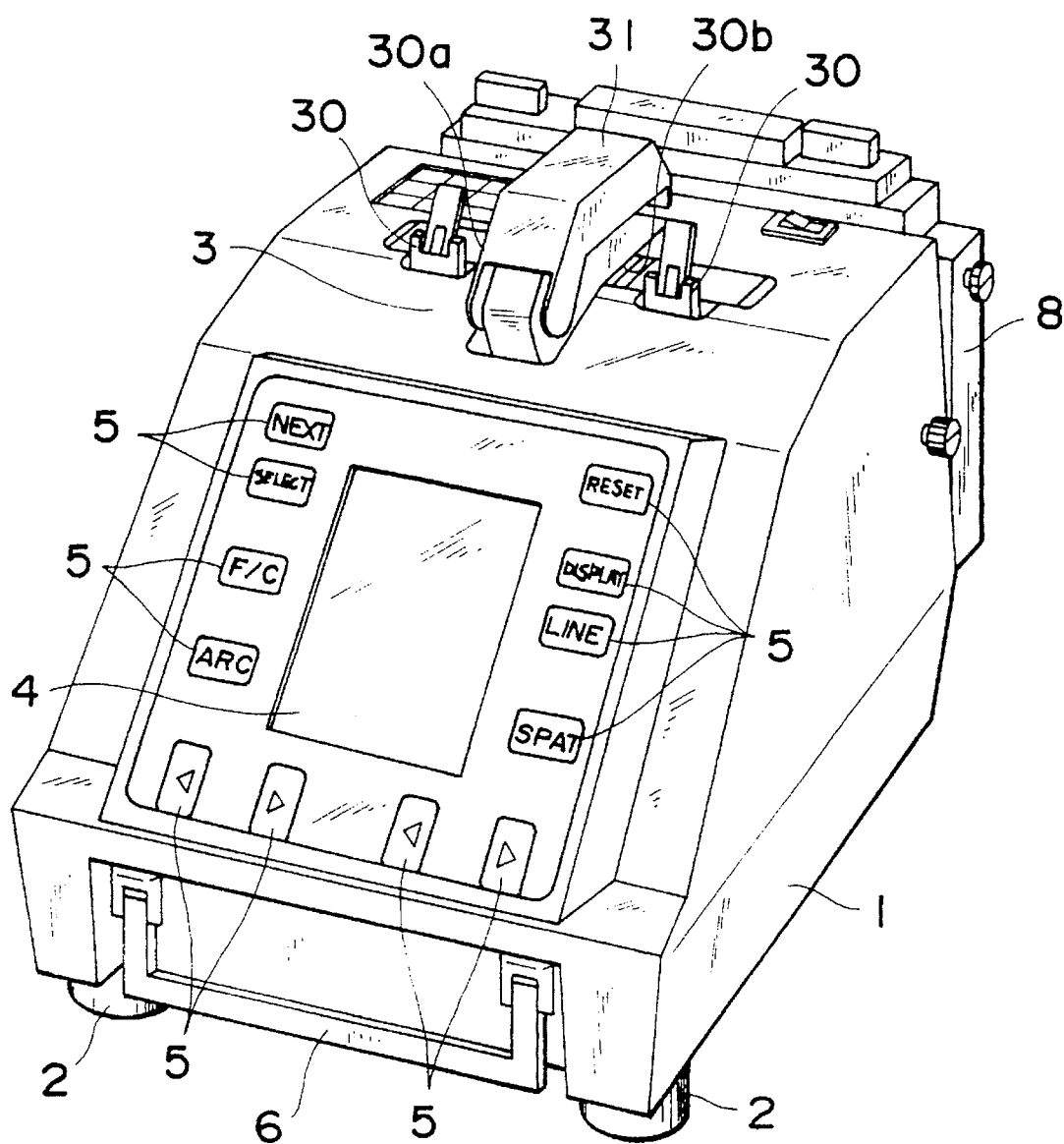
FIG. 2 is a perspective view showing the optical fiber fusion splicer according to the present invention from which its cover is removed.

As shown in FIG. 2, the fusion splicer 1 is basically formed as a parallelepiped and is of a small size and is light-weight so that it can be operated easily. Most of the front surface of the fusion splicer 1 is inclined in the front-to-rear direction. As shown in FIG. 1, circular conical legs 2 are disposed on the four corners of the lower surface of the fusion splicer 1 through screws.

As shown in FIG. 2, a fusion splicing mechanism 3 is provided to the upper surface of the fusion splicer 1. The fusion splicing mechanism 3 fixes a pair of fiber holders (not shown) in its fiber holder chucks 30. A pair of optical fibers F1, F2 (see FIG. 6) are holed by the fiber holders (not shown), and the fibers F1, F2 are arranged in the V-shaped grooves (see FIG. 14). Therefore, the fibers are aligned each other. After the fibers are arranged on the splicing mechanism 3, the splicing mechanism 3 performs electrical discharge between electrodes 4 and 7 (see FIG. 14), and melts to splice the optical fibers.

The fusion splicing mechanism 3 is provided in a housing 300 and splices optical fibers F1 and F2. The electrodes 4 and 7 that perform electrical discharge are disposed on the central portion of the upper surface of the fusion splicer 1 and are covered with a detachable electrode protection cover or lid 31 so that they are effectively protected from the outside.

As shown in FIG. 2, one monitor display 4 is provided to an inclined front surface 300f of the fusion splicer 1 to clearly indicate the fusion-spliced state of the pair of optical fibers. A plurality of operation buttons 5 are disposed to surround the monitor display 4. A substantially U-shaped handle 6 is mounted to an elevation lower portion 300a of the front surface 300f to be vertically pivotal.

Figure 4:
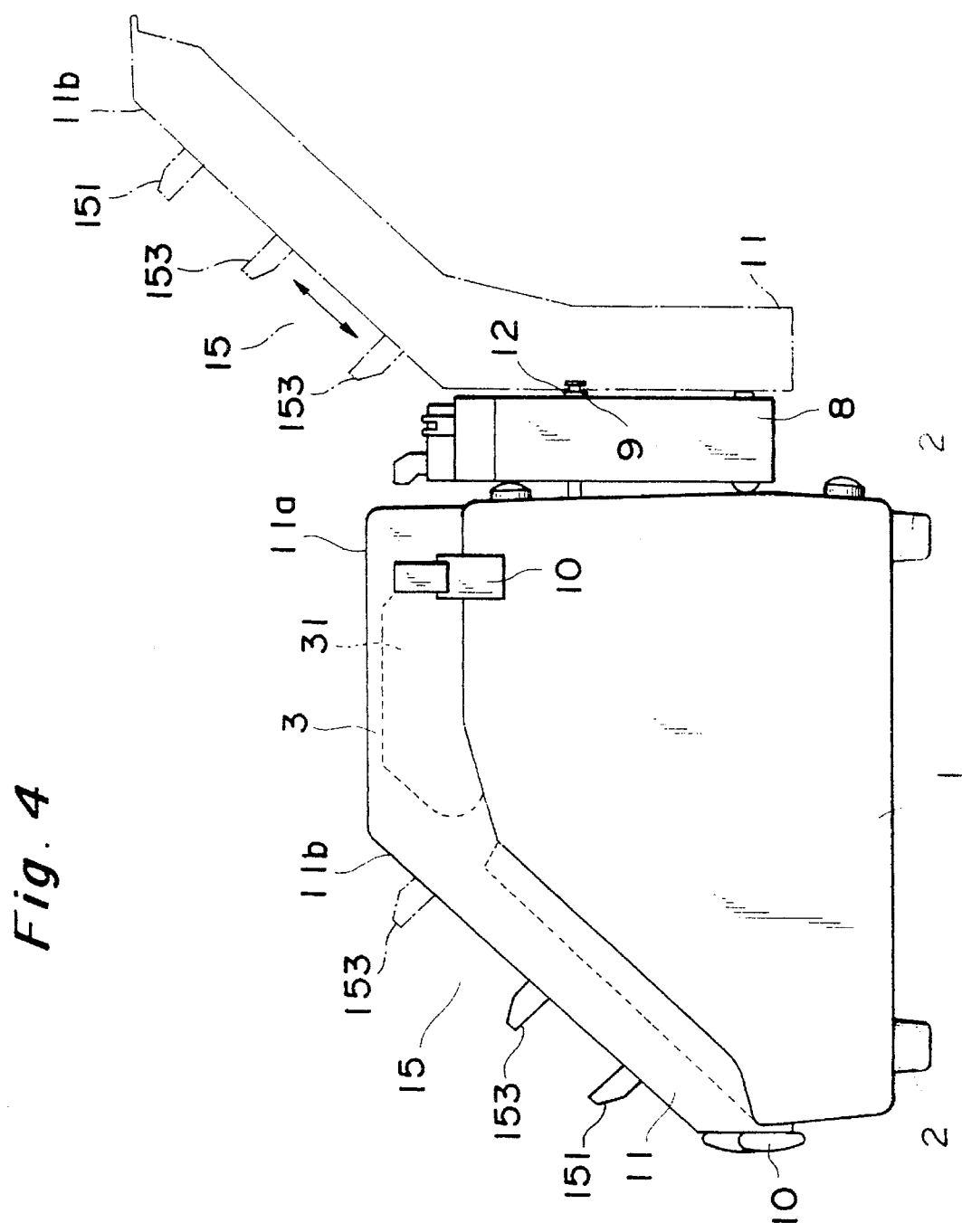
FIG. 4 is a side view showing the optical fiber fusion splicer according to the embodiment of the present invention.
Figure 5:
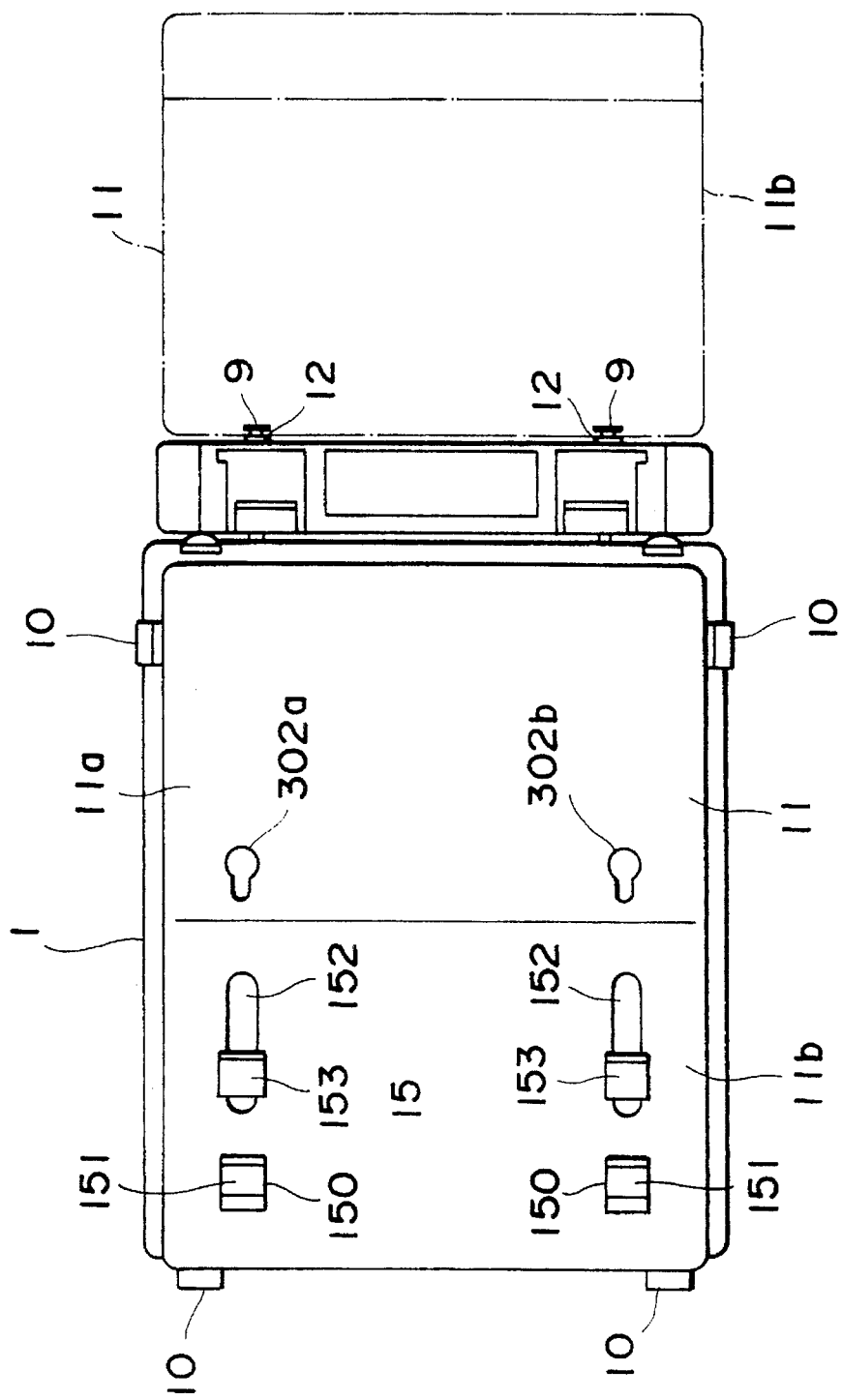
FIG. 5 is a plan view showing the optical fiber fusion splicer according to the embodiment of the present invention.
Figure 14:
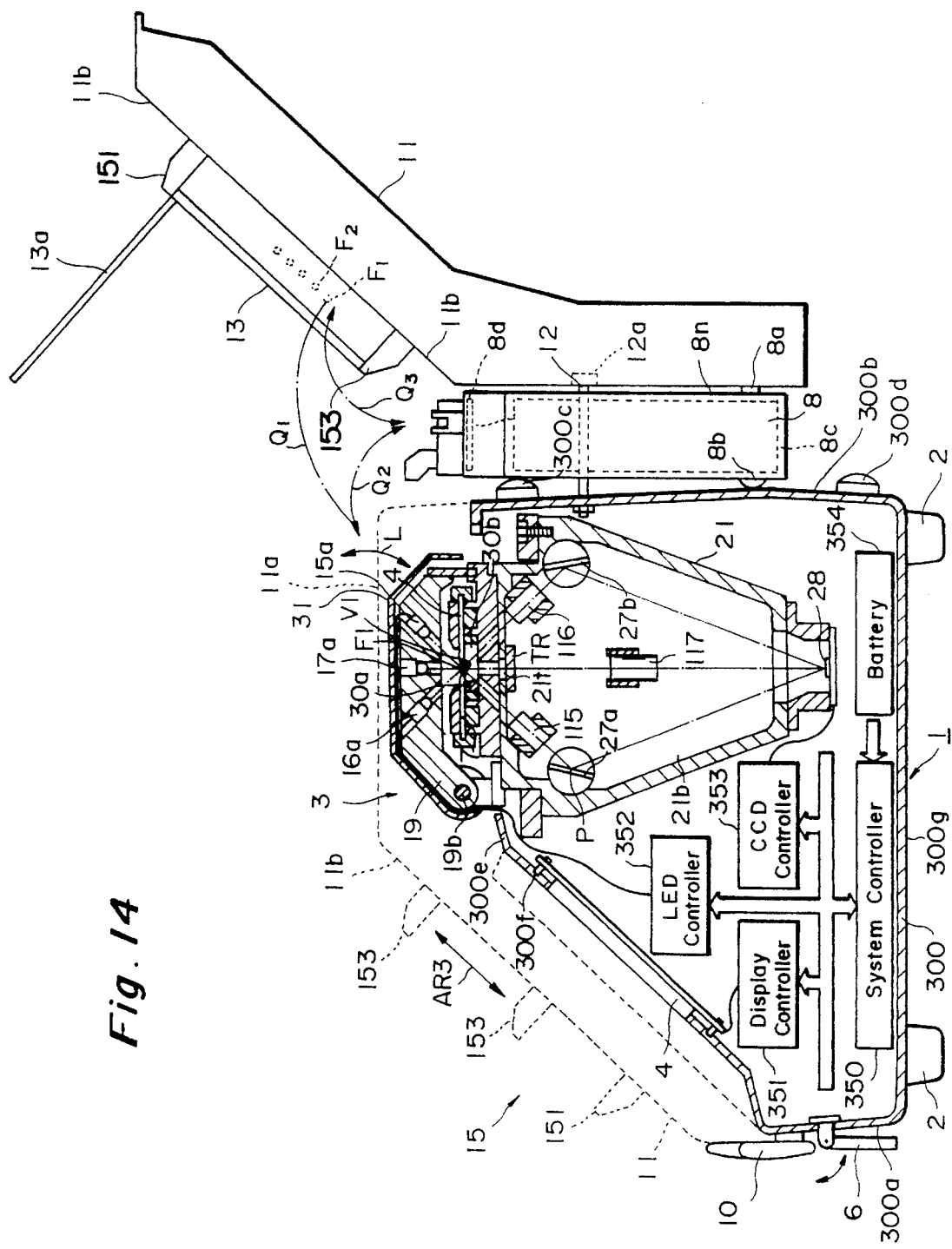
FIG. 14 is a sectional view of the apparatus shown in FIG. 1 according to the embodiment.

As shown in FIGS. 4, 5 and 14, a heater 8 for heating a tube TU that protects the fusion-spliced portion of the optical fibers F1 and F2 is detachably mounted to a rear surface 300b of the fusion splicer 1. A plurality of knobs 9 project on a rear surface 8n of the heater 8. The heater 8 substantially constitutes the rear surface portion of the fusion splicer 1. As shown in FIG. 1, a plurality of lock members 10 for detachably mounting and fixing the cover 11 to the fusion splicer 1 are disposed on the upper portions of the two side surfaces and the lower portion of the front surface, respectively, of the fusion splicer 1.

The cover 11 is bent to have a substantially V-shaped section, as shown in FIG. 1. A plurality of knob holes 12 to fit on the plurality of knobs 9 are formed in a flat surface 11a of the cover 11. When the fusion splicer 1 is not in use, the cover 11 is mounted to a portion of the fusion splicer 1 ranging from its front surface to its upper surface provided with the fusion splicing mechanism 3 with the plurality of lock members 10, and covers and protects the fusion splicing mechanism 3, the monitor display 4, and the plurality of operation buttons 5. When the fusion splicer 1 is in use, in other words, when a pair of optical fibers are to be fusion-spliced, the cover 11 is caught and supported by the plurality of knobs 9 of the heater 8 of the fusion splicer 1 through the plurality of knob holes 12 in substantially a V-shaped upright state, as shown in FIGS. 4 and 5. Accordingly, when the pair of optical fibers are to be fusion-spliced, an inclined surface 11b of the cover 11 is located above and behind the fusion splicing mechanism 3.

Figure 6:
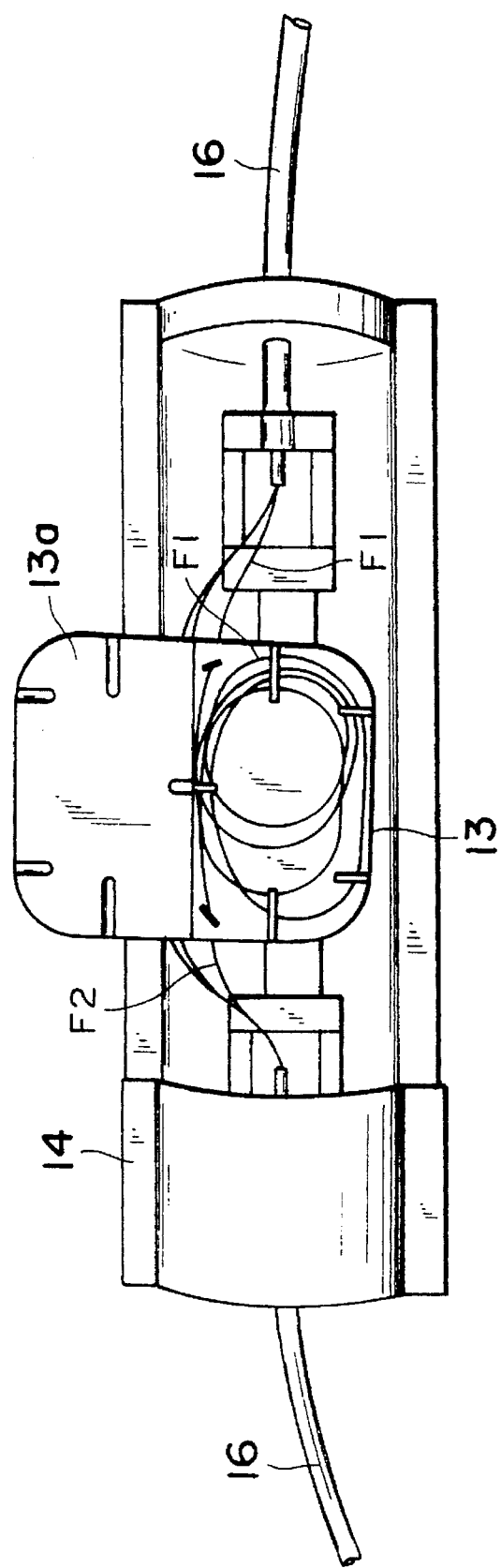
FIG. 6 is a plan view showing an optical cable mechanical closure of the optical fiber fusion splicer according to the present invention.
Figure 13:
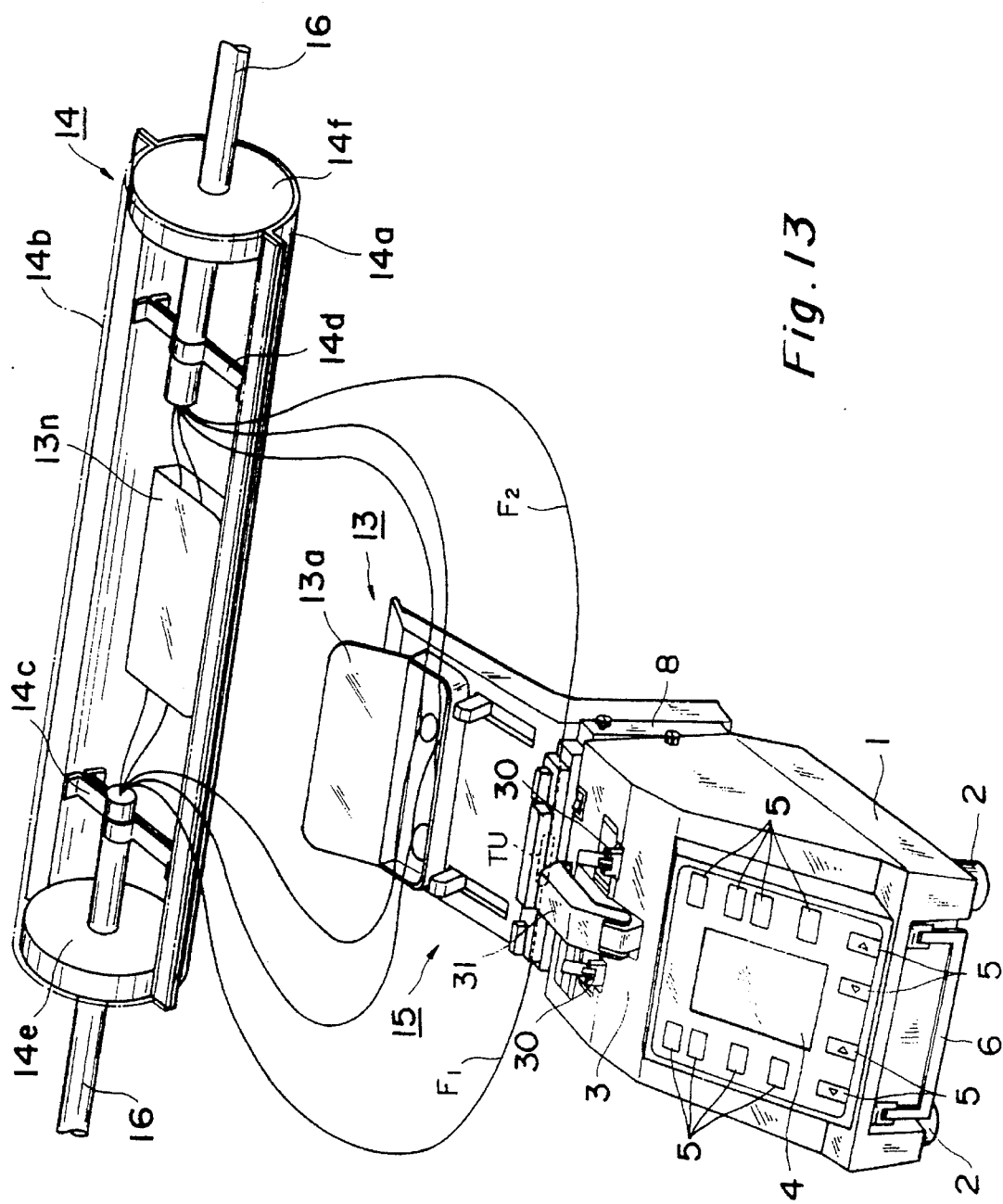
FIG. 13 shows a state wherein the tray is extracted from the closure 14, fibers F1, F2 are extracted from the tray 13, the fibers F1, F2 are spliced, and the spliced fibers F1, F2 are stored in the tray 13.

As shown in FIG. 6, an openable lid 13a which has a substantially box-like flat structure with an upper open surface is pivotally mounted to the storing tray 13. While the storing tray 13 stores and protects the excessive processing portion of the optical fibers 7 including the fusion-spliced portion, the storing tray 13 is incorporated in and protected by a build-up optical cable mechanical closure 14 or the like. The mechanical closure 14 is also shown in FIG. 13, and the closure 14 has a sleeve for storing the tray 13. The sleeve has two half-cylindrical members 14a, 14b. The closure 14 has two sealing members 14e, 14f. The sleeve has two openings facing each other. The openings is sealed by these sealing members 14e, 14f, when the half-cylindrical member 14a and 14b are combined each other to form the sleeve. The fiber cable 16 penetrates the sealing member 14e, 14f, and is gripped by a cable holder 14c, 14d. The cable holder 14c and 14d are attached to the sleeve. Another tray 13n is located in the mechanical closure 14.

The lid 13a of the storing tray 13 is not always necessary and can be omitted. The build-up optical cable mechanical closure 14 need not always be used, and it is apparent that a splicing box or the like can be used instead. The outer surfaces of a plurality of optical fibers 7 excluding their fusion-spliced portion are covered by a plastic film or the like and are bundled together, as shown in FIG. 6, thereby constituting an optical cable 16. The optical cable mechanical closure 14 is waterproof and airtight, as shown in FIG. 6, and is buried, e.g., underground.

As shown in FIGS. 1 and 4, the holding means 15 is retractably constituted by stationary pawls or pawl members 151 that project to the outside from a plurality of stationary pawl holes 150, and movable pawls or pawl members 153 that project to the outside from a plurality of movable pawl grooved holes 152, and clamp the storing tray 13 with the stationary pawls 151 and the movable pawls 153 that correspond to storing tray fixing holders.

Figure 3:
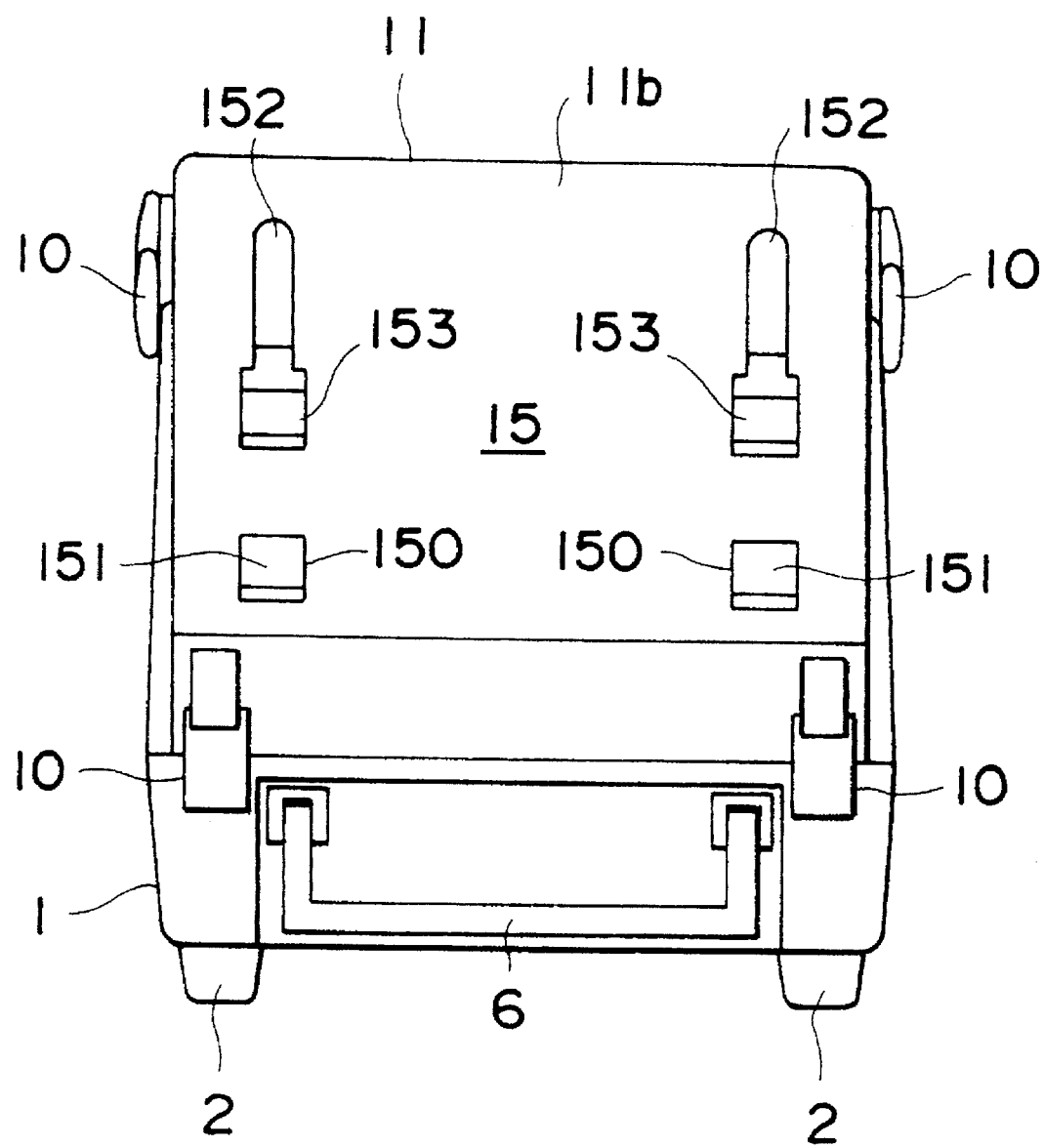
FIG. 3 is a front view showing the optical fiber fusion splicer according to the embodiment of the present invention.

As shown in FIG. 3, the plurality of (two in this embodiment) stationary pawl holes 150 are formed on the two sides of the inclined surface 11b of the cover 11. Each of the (two in this embodiment) stationary pawls 151 has a partly inclined distal end portion. Pins or shafts 315g and 315f (see FIG. 11) project (from the corresponding stationary pawls 151 and 153) on the two sides under the pawls 151 and 153, respectively. Two pins 315g are pivotally supported by a pair of pivotal support portions located on the two sides of the stationary pawl holes 150 on the rear surface side of the cover 11.

When the cover 11 covers the fusion splicer 1, in other words, when the fusion splicer 1 is not in use, the stationary pawls 151 are retracted inside the cover 11. When the cover 11 is supported, in other words, when the fusion splicer 1 is in use, the stationary pawls 151 project to the outside from the plurality of stationary pawl holes 150.

As shown in FIG. 3, the plurality of (two in this embodiment) movable pawl grooved holes 152 are formed as elongated grooves on the two sides of the inclined surface 11b of the cover 11 and are covered with a guide cover or case 315c from the rear surface of the cover 11. Each of the (two in this embodiment) deformable movable pawls 153 has a partly inclined distal end portion. Two pins 315f (see FIG. 11) project on the two sides under the movable pawls 153 and are fitted in slits (not shown) in the two sides of the guide cover 315c. A tension spring SP (see FIG. 11) that increases the clamping force of the stationary pawls 151 and 153 is connected between the lower portions of each pair of the movable pawls 153 and 151.

In this embodiment, the tension spring SP is mounted to the lower portion of the stationary pawl 151. However, the end portion of the tension spring SP on the stationary pawl 151 side may be directly mounted to the rear surface of the cover 11. Although this embodiment shows the tension spring, other types of existing springs or other elastic members, e.g., a rubber member, may be used instead.

When the cover 11 covers the fusion splicer 1, in other words, when the fusion splicer 1 is not in use, the movable pawls 153 are retracted inside the cover 11. When the cover 11 is supported, in other words, when the fusion splicer 1 is in use, the movable pawls 153 project to the outside from the plurality of movable pawl grooved holes 152 to respectively oppose the stationary pawls 151. As shown in FIG. 1, the storing tray 13 in the open state is clamped and held by the stationary pawls 151 and the movable pawls 153. Therefore, when a pair of optical fibers are to be fusion-spliced, the open storing tray 13 is located above and behind the fusion splicing mechanism 3, so that the fusion splicing operation and the storing/protecting operation of the optical fibers 7 can be performed almost simultaneously.

The positions of the stationary pawls 151 and 153 in the vertical direction are opposite between a case wherein the cover 11 is mounted to a portion of the fusion splicer 1 ranging from its front to upper surface, as shown in FIG. 4, and a case wherein the cover 11 is supported by the heater 8 of the fusion splicer 1 in a substantially V-shaped upright state, as shown in FIG. 1.

A method of using the fusion splicer 1 and the operation of the fusion splicer 1 will be described. When the fusion splicer 1 is not in use, the cover 11 is mounted to a portion of the fusion splicer 1 ranging from its front to upper surface with the plurality of lock members 10. In this case, the stationary pawls 151 and the movable pawls 153 corresponding to the storing tray fixing holders are extracted and stored inside the cover 11. Thus, the inclined surface 11b of the cover 11 is flat and maintains the good outer appearance of the surface of the cover 11. Accordingly, when the fusion splicer 1 is not in use, the stationary pawls 151 and the movable pawls 153 will not interfere with projections or the like at all.

In contrast to this, when the fusion splicer 1 is in use, the plurality of lock members 10 are released to remove the cover 11 from the fusion splicer 1. The flat surface 11a of the cover 11 is supported by the plurality of knobs 9 of the heater 8 of the fusion splicer 1 through the plurality of knob holes 12 in a substantially V-shaped upright state, and the inclined surface 11b of the cover 11 is located above and behind the fusion splicing mechanism 3.

Subsequently, the stationary pawls 151 and the movable pawls 153 that are retracted and stored inside the cover 11 are rotated to project and appear from the cover 11. The storing tray 13 in the open state is clamped and held by the plurality of stationary pawls 151 and movable pawls 153. Since the plurality of movable pawls 153 located at an upper position are slid and displaced as they are being guided in the movable pawl grooved holes 152 while they are stored inside the guide cover 315c, they can easily clamp and hold the storing tray 13 regardless of the size of the storing tray 13. Then, a pair of naked optical fibers may be set in the fusion splicing mechanism 3 to abut against and oppose each other, and the plurality of operation buttons 5 of the fusion splicer 1 may be appropriately depressed.

Then, the fusion splicer 1 cleans the end faces of the pair of optical fibers 7, adjusts the gap between the end faces of the pair of optical fibers 7, inspects the end faces of the pair of optical fibers 7, and aligns the cores of the pair of optical fibers 7. The pair of optical fibers 7 are fusion-spliced by the fusion splicing mechanism 3, and then the end faces of the optical fibers 7 are inspected. If the fusion-spliced pair of the optical fibers 7 has a good outer appearance, a reinforcing tube mainly comprising a heat-shrinkable tube, which is applied on the fusion-spliced optical fibers 7 in advance, is heated to shrink on the fusion-spliced portion to protect the optical fibers 7, thereby ending the fusion splicing operation.

When the fusion splicing operation of the optical fibers 7 is ended in this manner, a portion of the fusion-spliced optical fibers near the fusion-spliced portion may be coiled in a loop by a plurality of turns as an excessive processing portion, and the excessive processing portion including the fusion-spliced portion may be stored and protected in the storing tray 13 in the open state. Since the storing tray 13 is located above and behind the fusion splicing mechanism 3 (see FIG. 1), the fusion splicing operation and the storing/protecting operation can be performed almost simultaneously, making it very easy to store and protect the fusion-spliced optical fibers 7.

With the above arrangement, when the fusion splicer 1 is in use, the inclined surface 11b of the cover 11 is located above and behind the fusion splicing mechanism 3, and the stationary pawls 151 and the movable pawls 153 retracted and stored inside the cover 11 project and are exposed to the outside. Since the stationary pawls 151 and the movable pawls 153 corresponding to the storage tray fixing holders hold the storing tray 13 by clamping, the storage tray fixing holders need not be formed as independent exclusive accessories at all. Accordingly, the necessity of storing and managing storage tray fixing holders, which are always needed for fusion splicing of the optical fibers, separately of the fusion splicer 1 can be avoided, so that the storage space for the accessories can be decreased and that the storing/managing operation can be simplified. Since the fusion splicing operation and the storing/protecting operation can be performed almost simultaneously, the fusion-spliced optical fibers 7 can be stored and protected very easily through simplification and unification of the operation. In addition, preparation of necessary equipment for fusion splicing of the optical fibers 7 can be greatly simplified.

In the above embodiment, the fusion splicer 1 having the structure as shown in FIG. 2 is used. However, the fusion splicer is not limited to this type and one having any structure can be used as far as it has an operation and a function similar to those of the above embodiment. In the above embodiment, the storing tray 13 having the structure as shown in FIG. 6 is used. However, the storing tray is not limited to this type and one having any structure can be used as far as it has an operation and a function similar to those of the above embodiment. In the above embodiment, the plurality of knobs 9 and knob holes 12 are formed. However, any other locking members can be used to provide the same operation and effect of the above embodiment as far as they have an operation and a function similar to those of the above embodiment. In the above embodiment, the cover 11 is supported by the heater 8 of the fusion splicer 1 in a substantially V-shaped upright state. However, the cover 11 may be supported by the rear surface itself of the fusion splicer 1. Even when the cover 11 is supported by a side surface or the like of the fusion splicer 1, an operation and an effect similar to those of the above embodiment can be obtained as far as it allows the fusion splicing operation and the storing/protecting operation to be done almost simultaneously. The cover 11 may be formed or supported to have a shape other than a V shape. In the above embodiment, the holding means 15 having the structure as shown in FIG. 1 and the like is used. However, it is apparent that the number, shape, structure, and number of the holding means are not limited to those of the above embodiment as far as the holding means has an operation and a function similar to those of the above embodiment. In particular, even if the plurality of stationary pawls 151 and movable pawls 153 are mounted on the cover 11 with other known technique, an operation and an effect similar to those of the above embodiment can be obtained. In the above embodiment, the plurality of stationary pawls 151 and movable pawls 153 hold the storing tray 13. However, the holding manner is not particularly limited as far as it provides an operation similar to that of the above embodiment, and it is apparent that the storing tray 13 may be clamped, gripped, tightly held, or chucked. Even when the plurality of stationary pawls 151 and movable pawls 153 are caused to project and retract separately, or in a synchronous manner, an operation and an effect similar to those of the above embodiment can be expected. In the above embodiment, when the optical fibers 7 are to be fusion-spliced, the stationary pawls 151 and movable pawls 153 inside the cover 11 are caused to project or appear from the cover 11. However, if necessary, the stationary pawls 151 and the movable pawls 153 may be caused to project and appear from the cover 11 in a case other than the above case while providing an operation and an effect similar to those of the above embodiment.

This apparatus will be described in more detail.

How to use this apparatus will be described first.

As shown in FIG. 13, a plurality of optical fibers F1 and F2 are extracted from the closure 14. The tray 13 is gripped by the gripping mechanism 15. A holder 19 holds LEDs 15a, 16a, and 17a, shown in FIG. 14. The holder 19 is mounted to an inner housing 21 with a shaft 19b. The holder 19 can rotate in directions of a two-headed arrow L in FIG. 14 about the shaft 19b as the center. The holder 19 covers the electrodes 4 and 7.

The optical fiber F1 is inserted into the reinforcing tube TU. The holder 19 is moved to expose an installation table 30a, and the optical fibers F1 and F2 are arranged on the installation table 30a and an installation table 30b, respectively. A lid 31 is fixed to the holder 19. After the holder 19 is closed, the optical fibers F1 and F2 are spliced with the splicing mechanism 3.

After the optical fibers F1 and F2 are spliced, the reinforcing tube TU is moved to the spliced position of the optical fibers F1 and F2. The spliced optical fiber is arranged in the heater 8. The heated reinforcing tube TU shrinks to reinforce the spliced portion of the optical fibers F1 and F2.

The reinforced optical fiber is stored in the tray 13. When a plurality of optical fibers are stored in the tray 13, the lid 13a of the tray 13 is closed. Thereafter, the tray 13 is stored in the closure 14. In this apparatus, since the covers (11 and 15) also serve as units for gripping the tray, the operation efficiency is increased.

The structure of this apparatus will be described in more detail.

FIG. 14 is a sectional view of the apparatus in a use state.

This apparatus comprises:

(a) an installation table 30a (30b) for arranging the optical fiber F1 (F2) thereon in order to splice the optical fibers F1 and F2;

(b) the cover member 11 for covering the installation table 30a (30b); and (c) the gripping mechanism 15, attached to the cover member 11, for gripping the tray 13.

When the fusion splicer 1 is not in use, the installation table 30a is covered with and protected by the cover member 11.

When the apparatus is in use, the cover member 11 is moved relative to the housing 300 and the installation table 30a (30b) arranged in the housing 300. The cover member 11 is removed from the housing 300. When the cover member 11 is moved, the installation tables are exposed, so that the optical fibers F1 and F2 can be placed thereon. The gripping mechanism 15 is enabled to grip the tray 13. The optical fibers F1 and F2 are placed on the installation tables 30a and 30b. A V-shaped groove V1 for holding the optical fiber F1 is formed in the installation table 30a. A V-shaped groove (not shown) for holding the optical fiber F2 is formed in the installation table 30b. These optical fibers F1 and F2 are spliced. Since the tray 13 is gripped by the gripping mechanism 15, the spliced optical fibers F1 and F2 are stored in the tray 13.

This apparatus comprises:

(d) an image sensor 28 for observing the optical fibers F1 and F2 placed on the installation tables 30a and 30b;

(e) the housing 300 for storing the image sensor 28; and (f) the display 4 for displaying an output from the image sensor 28.

This apparatus further comprises:

(g) the heater 8 mounted to the housing 300 such that the installation table 30b is arranged between the display 4 and the heater 8. The operator moves the optical fibers F1 and F2 as indicated by arrows Q1 to Q3. First, the optical fiber F1 is moved from the tray 13 into the splicing mechanism 3 as indicated by the arrow Q1. Then, the optical fiber F1 is moved from the splicing mechanism 3 and arranged in the heater 8, as indicated by the arrow Q2. Then, the optical fiber F1 is moved from within the heater 8 into the tray 13, as indicated by the arrow Q3.

The operator splices the optical fibers F1 and F2 by using the installation tables 30a and 30b, fits the reinforcing tube (not shown) on the spliced portion of the optical fibers F1 and F2, and heats the reinforcing tube. Since the installation tables 30a and 30b are arranged between the display 4 and the heater 8, a series of operations consisting of observation of the optical fibers displayed on the display 4, splicing of the optical fibers, and heating of the reinforcing tube can be performed by the operator very easily.

In particular, when the cover member is mounted to the heater, the efficiency of the operation of splicing the optical fibers F1 and F2 is remarkably increased. The optical fibers heated by the heater 8 are arranged as they are in the tray 13 gripped by the gripping mechanism 15 mounted to the cover member 11.

The ends of the optical fibers F1 and F2 are melted to splice the optical fibers F1 and F2. This fusion splicing apparatus is controlled by a system controller 350. The optical fibers F1 and F2 respectively arranged on the installation tables 30a and 30b are observed through microscopes 115, 116, and 117. The images of the optical fibers F1 and F2 are picked up by a CCD image sensor 28 through the microscopes 115, 116, and 117. The optical images passing through the microscopes 115 and 116 are reflected by mirrors 27a and 27b, respectively, and are irradiated to the CCD image sensor 28.

The optical fibers are imaged from different directions by switching on/off the LEDs 15a, 16a, and 17a. A shutter 22 and a transparent glass plate TR are arranged between the LED 17a and the microscope 117. The glass plate TR prevents dust from entering the inner housing 21. Light emission of the LEDs 15a, 16a, and 17a is controlled by an LED controller 352. The CCD image sensor 28 is controlled by a CCD controller 353. A video signal from the CCD controller 353 is AD-converted by the CCD controller 353 and stored in the memory of the system controller 350.

Image information from the CCD image sensor 28 is transferred to a display controller 351 in accordance with a designation of the system controller 350. The display controller 351 displays the transferred image information on the display 4. The system controller 350 receives power from a battery 354.

Since the battery 354 and the discharge electrodes 4 and 7 are electrically connected to each other, electrical discharge occurs between the discharge electrodes 4 and 7. The opposing end portions of the optical fibers F1 and F2 are melted by this electric discharge, and the optical fibers F1 and F2 are spliced.

Figure 15:
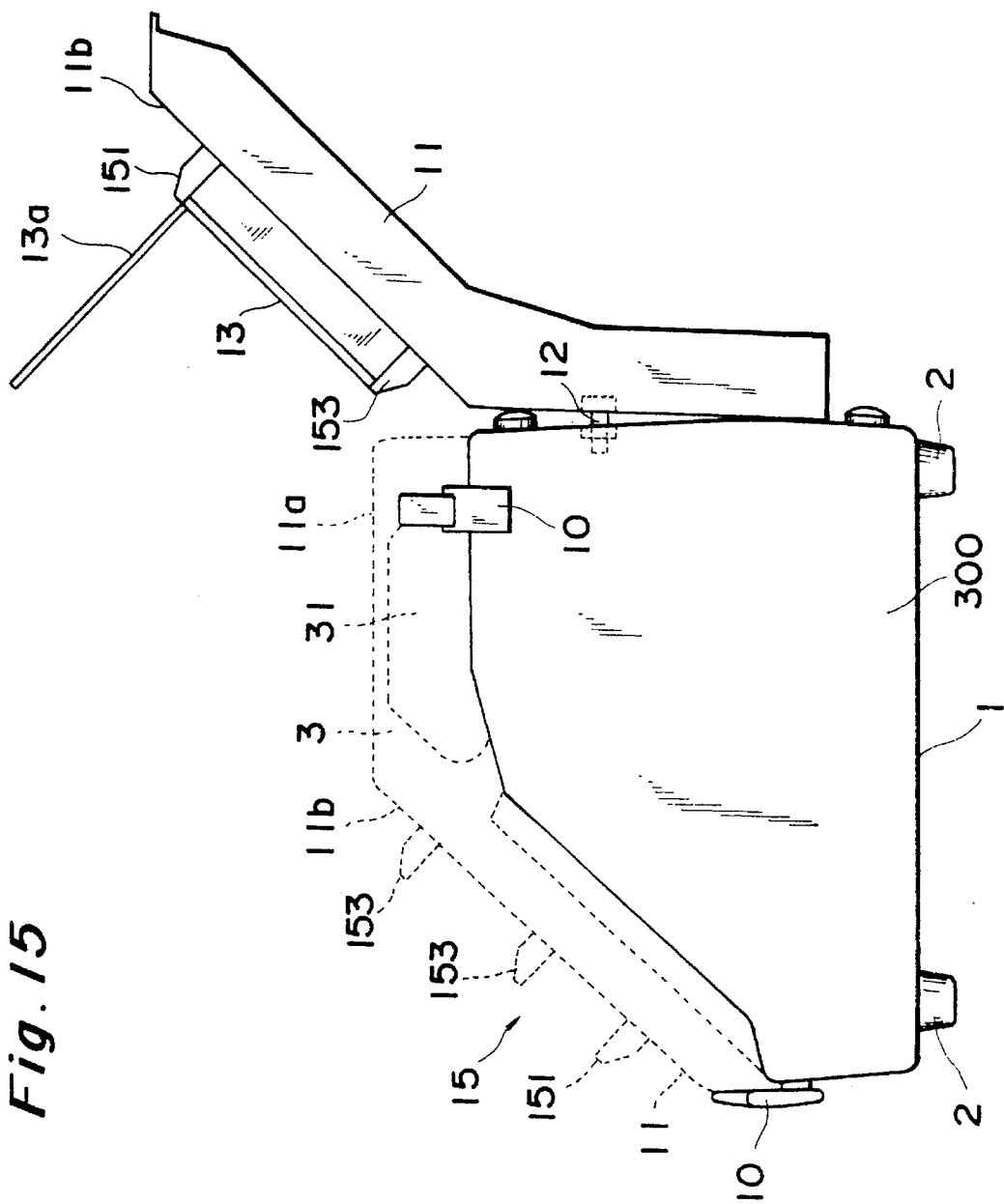
FIG. 15 is a side view of an apparatus according to another embodiment, in which a housing and a cover member are connected through bolts.

As shown in FIG. 15, when no heater 8 is mounted to a housing 300, a cover member 11 is directly mounted to the housing 300.

The housing 300 has projections 12. The cover member 11 has through holes 302a and 302b to fit on the projections 12. These projections 12 are bolts. The through hole 302a has such a size that a portion 12a of the bolt 12 can be fitted in it. This portion 12a of the bolt is the head 12a of the bolt 12.

As shown in FIG. 16, a cover member 11 and a heater 8 may be connected to each other with hooks 11f and 8f that engage with each other.

The heater 8 has a rubber member 8a which is brought into contact with the cover member 11 to support it when one portion 12a of the bolt 12 is fitted in the through hole 302a of the cover member 11. The heater 8 has a rubber member 8b which is brought into contact with the housing 300 to support it. The heater 8 has a battery (power supply) 8c and a ceramic heater 8d electrically connected to the battery 8c. When power is supplied from the battery 8c to the ceramic heater 8d, the temperature of the ceramic heater 8d is increased. Thus, if the optical fibers F1 and F2 covered with the reinforcing tube TU are arranged in the heater 8, the reinforcing tube TU shrinks due to the heat.

The housing 300 has first and second surfaces 300a and 300b opposing each other. The heater 8 is mounted to the second surface 300b of the housing 300.

This apparatus further comprises:

(i) the handle 6 mounted to the first surface 300a of the housing 300; and (j) a rubber member 300c mounted to the second surface 300b of the housing 300.

Therefore, when the heater 8 is removed from the housing 300, if the handle 6 is held, the rubber member 300c is brought into contact with a place (not shown) where this apparatus is installed, thereby protecting this apparatus. The installation place is a road, ground, floor, or the like. When the heater 8 is mounted to the housing 300, the rubber member 300c is brought into contact with the heater 8 to apply a stress to it, thereby firmly supporting the heater 8.

The housing 300 has an installation surface 300e in the vicinity where the installation tables 30a and 30b are arranged, a bottom surface 300g opposite to the installation surface 300e, a front surface 300f intersecting the installation surface 300e at an obtuse angle, and the rear surface 300b opposite to the front surface 300f.

Figure 12:
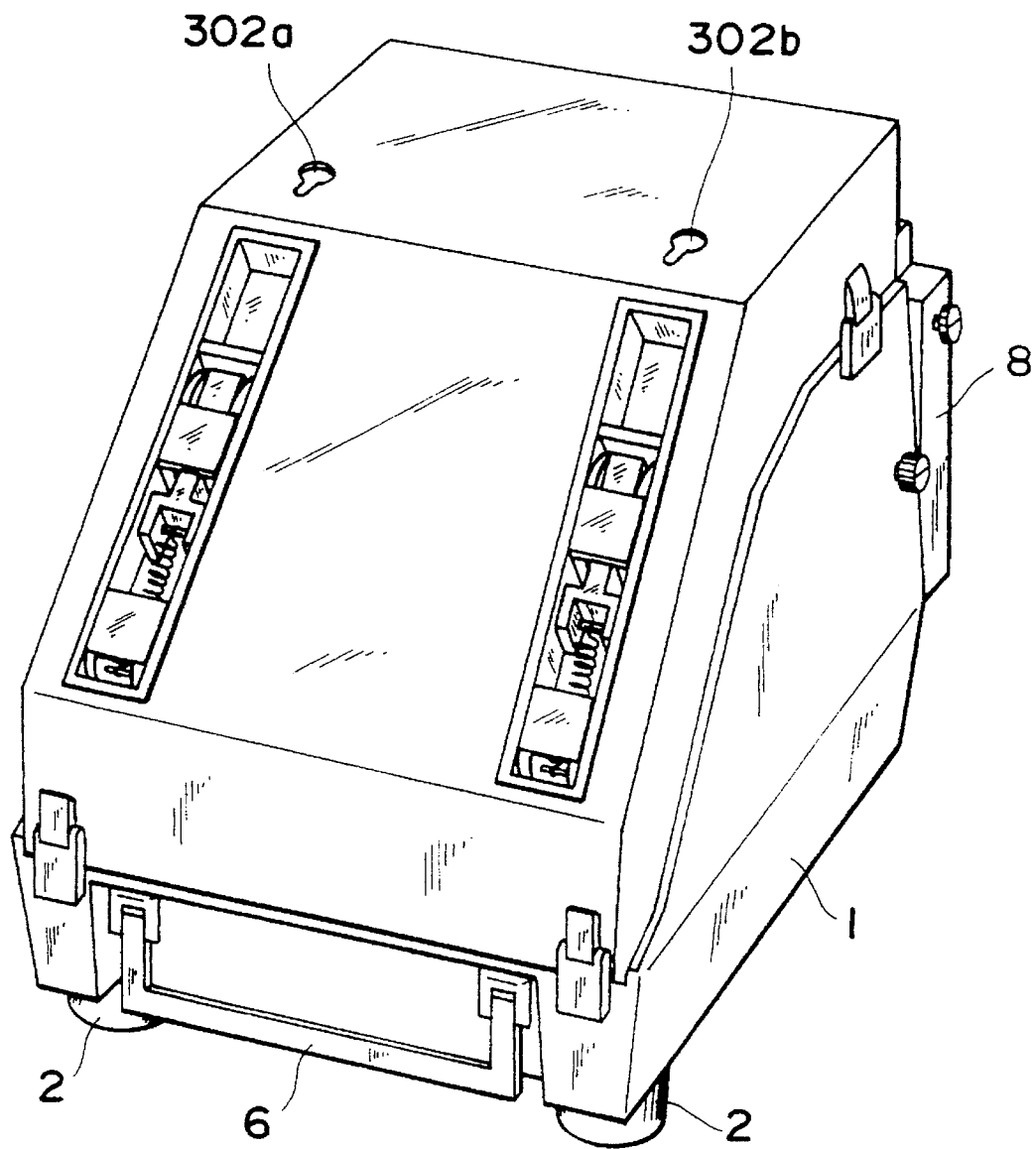
FIG. 12 shows a lid having the gripping mechanism shown in FIG. 11, and a fiber splicing unit having this lid.

The display 4 is mounted to the front surface 300f of the housing 300. This apparatus is arranged such that its installation surface 300e (bottom surface 300g) is substantially parallel to the horizontal plane. Since the front surface 300f is inclined with respect to the horizontal plane, when observing the display 4, the operator can easily observe it. The cover member 11 is bent along the installation surface 300e and the front surface 300f. FIG. 12 shows an apparatus in which the cover member 11 is closed.

Thus, when the installation tables 30a and 30b and the display 4 are covered with the cover member 11, they are protected. Since the cover member 11 is bent along the installation surface 300e and the front surface 300f, when the cover member I1 is mounted to the rear surface 300b side of the apparatus, the cover member 11 has a gripping surface 11b intersecting the installation surface 300e at an obtuse angle. The gripping mechanism 15 is mounted to the gripping surface 11b. Thus, the optical fibers F1 and F2 arranged on the installation tables 30a and 30b are easily moved into the tray 13 arranged in the gripping mechanism 15.

FIGS. 7A and 7B and FIGS. 8 to 11 show the gripping mechanism 15 in detail.

Figure 7A:
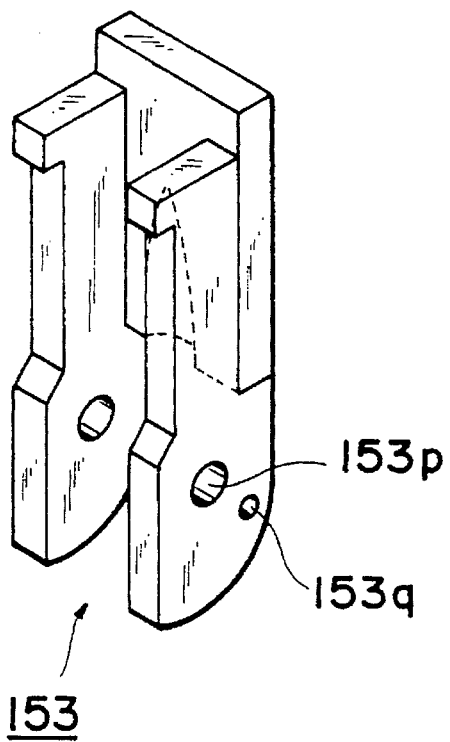
FIGS. 7A and 7B show pawl members for gripping a tray that stores optical fibers.
Figure 7B:
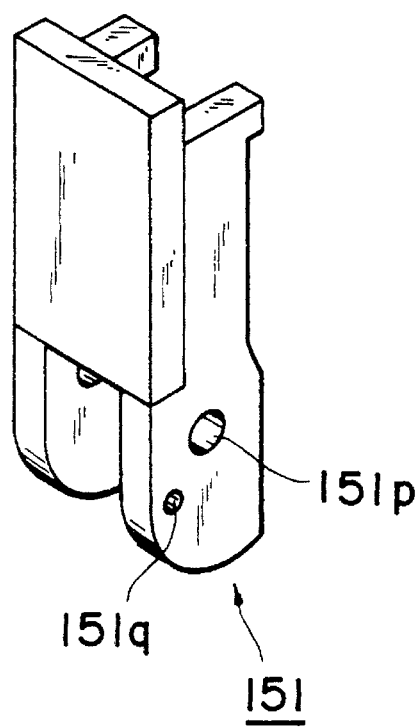

FIG. 7A shows one pawl member 153. The pawl member 153 has through holes 153p and 153q. FIG. 7B shows one pawl member 151. The pawl member 151 is of the same shape as that of the pawl member 153 and has through holes 151p and 151q.

Figure 8:
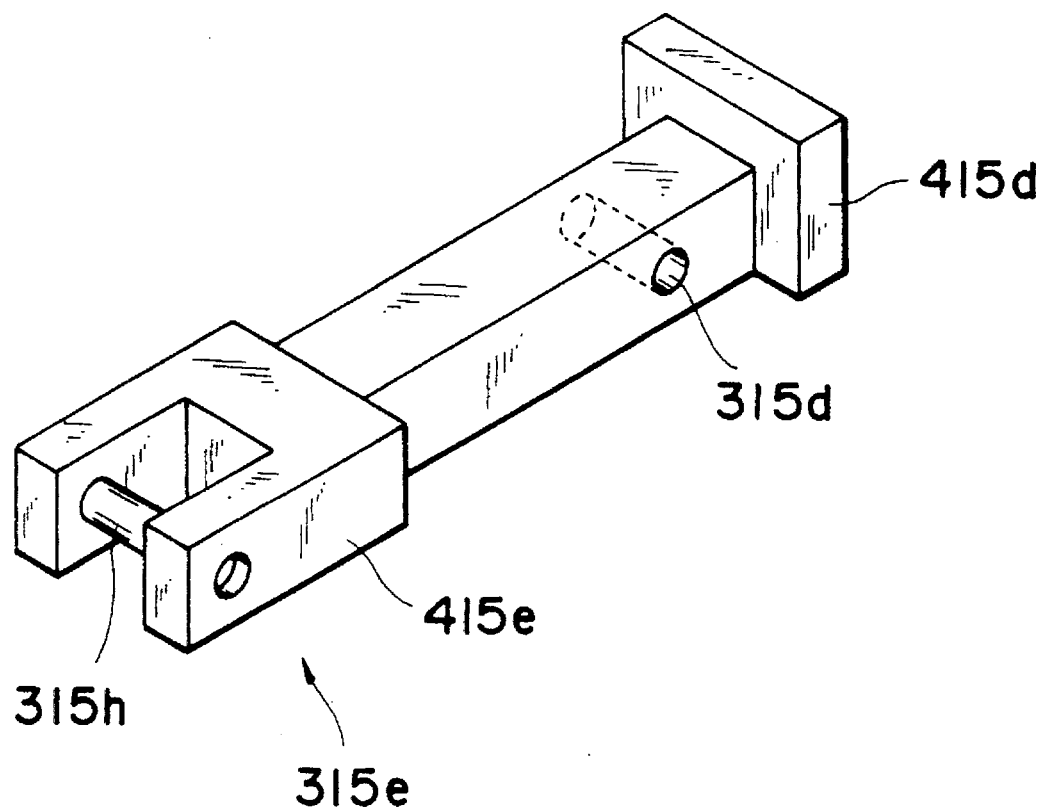
FIG. 8 shows the slide member of a gripping mechanism.

FIG. 8 shows a slider or slide member 315e. A pin 315h is fixed to a U-shaped head 415e of the slider 315e. A stopper 415d is fixed to one end of the slider 315e. The slider 315e has a through hole 315d.

Figure 9:
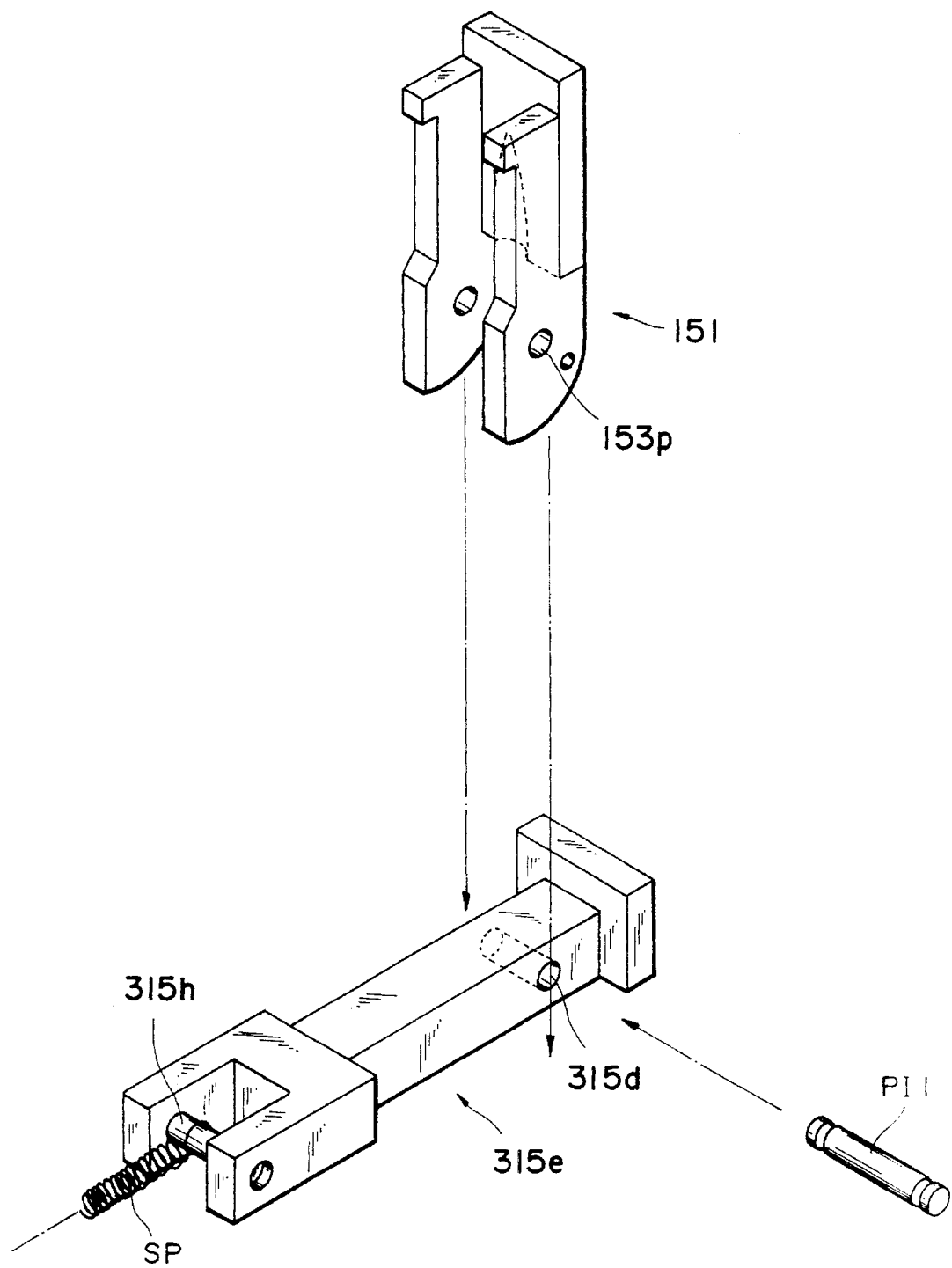
FIG. 9 shows the slide member, the pawl member, and the pin member of the gripping mechanism.

FIG. 9 shows a state wherein the slider 315e and the pawl member 151 are connected to each other through a pin (shaft) PI1. The pin PI1 extends through the through holes 153p and 315d.

Figure 10:
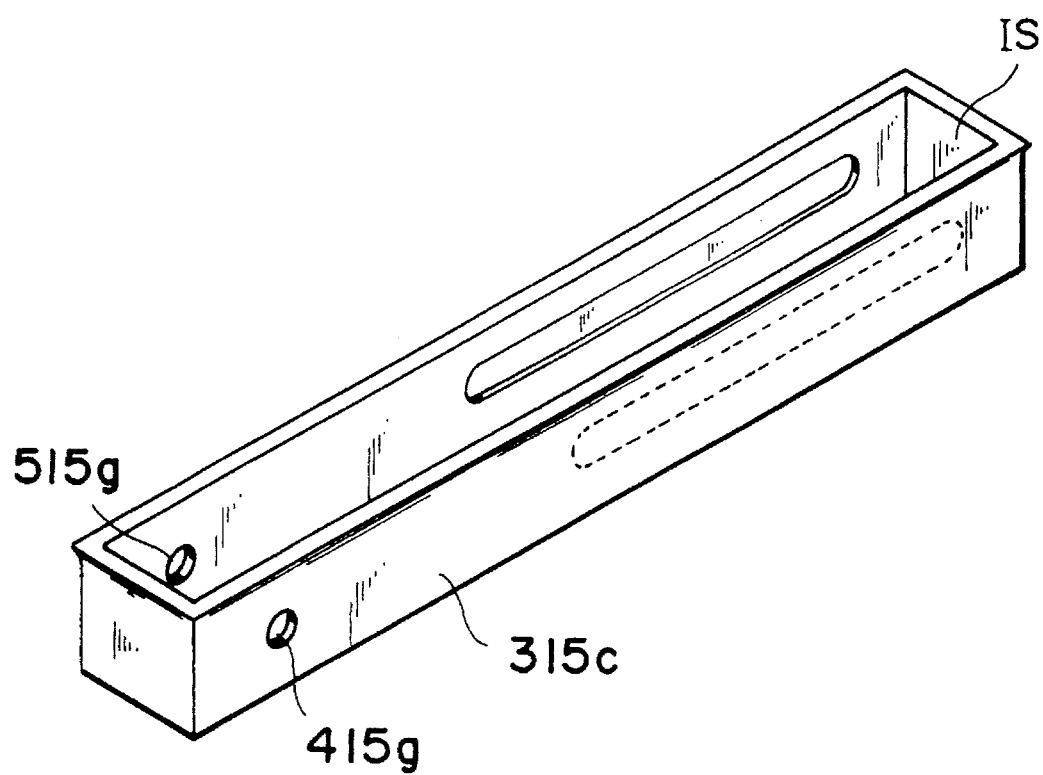
FIG. 10 shows the case of the gripping mechanism.

FIG. 10 shows the case 315c for storing the slider 315e and the first and second pawl members 153 and 151. The case 315c has opposite through holes 415g and 515g. The case 315c also has guide grooves 315a and 315b opposing its inner surface IS.

Figure 11:
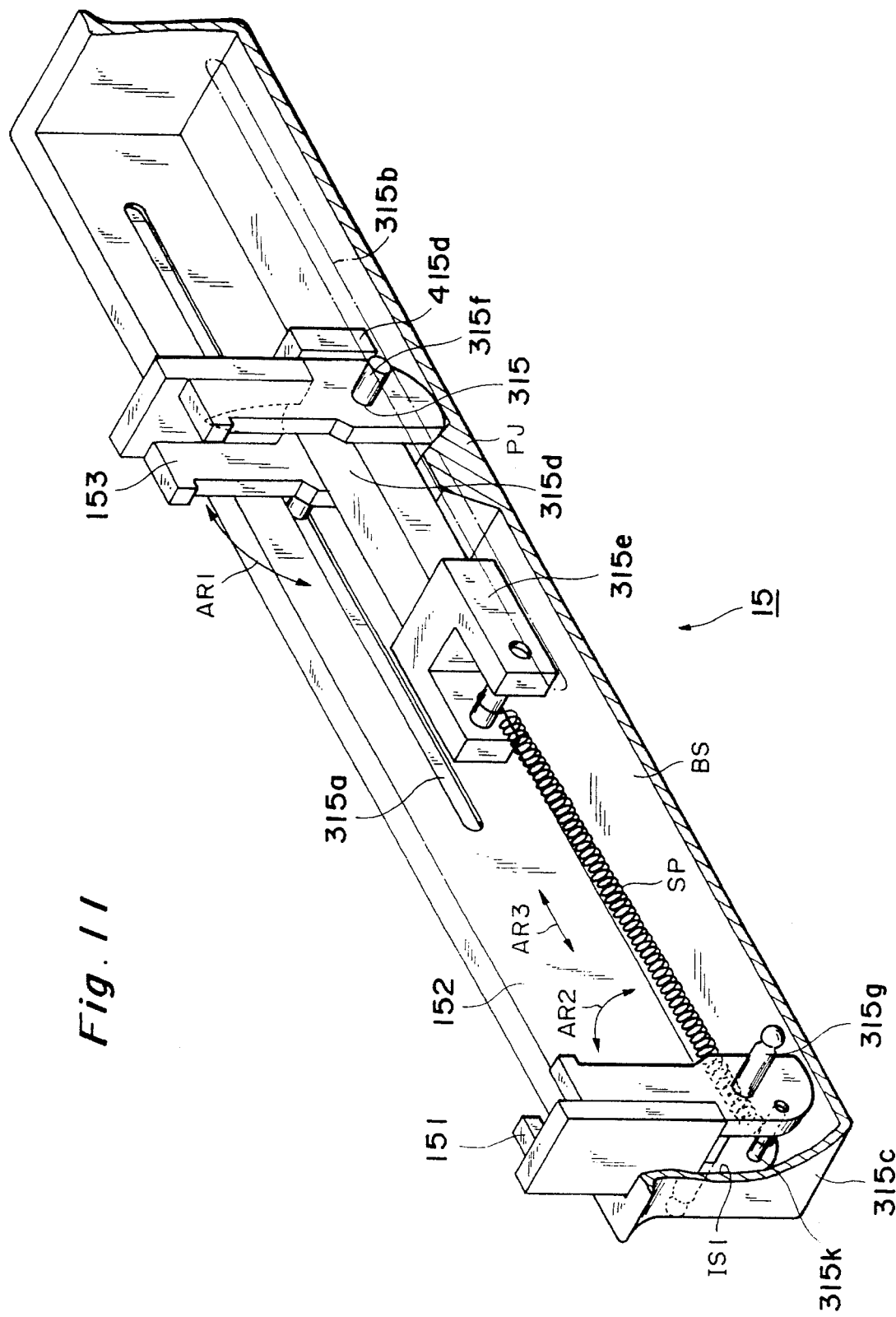
FIG. 11 shows a state wherein a slider and the pawl members are stored in the case shown in FIG. 10 and are connected to each other through a tension spring.

FIG. 11 shows the gripping mechanism 15. The case 315c has a bottom surface BS. A projection PJ is provided on the bottom surface BS. The projection PJ regulates the first pawl member 153 from moving toward the second pawl member 151 when the first pawl member 153 is upright.

This gripping mechanism 15 comprises:

(A) the case 315c having the guide grooves 315a and 315b in its inner surface, (B) the slide member 315e arranged in the case 315c and having the through hole 315d, (C) the shaft 315f extending through the through hole 315d and slidable in the guide grooves 315a and 315b, and (D) the first pawl member 153 mounted to the slide member 315e. Therefore, the first pawl member 153 moves along the guide grooves 315a and 315b. The first pawl member 153 moves in accordance with the size of the tray 13 and grips the tray 13.

The gripping mechanism 15 has the first pawl member 151 connected to the slide member 315e through the spring SP. The tray 13 is gripped by the first and second pawl members 153 and 151. Since the first and second pawl members 153 and 151 are pulled by each other through the spring SP, the tray (storing component) 13 is firmly held by the pawl members 153 and 151. The first and second pawl members 153 and 151 are arranged in the case 315c.

The pawl member 153 can be rotated about the shaft 315f as the center in directions of a two-headed arrow AR1. The pawl member 151 can be rotated about the shaft 315g as the center in directions indicated by a two-headed arrow AR2. The slider 315e and the second pawl member 151 are connected to each other through the spring SP. The second pawl member 151 has a pin 315k extending through the through hole 151q. The pin 315k is closer to the bottom surface BS than the pin 315g is. When the pin 315k is pulled toward the slider 315e, the pawl member 151 is set upright and brought into contact with an inner surface IS1 of the case 315c. The inner surface IS1 of the case 315c serves as the stopper for the pawl member 151. When the pawl member 153 is pulled by the spring SP toward the pawl member 151, the pawl member 153 is set upright and brought into contact with the stopper 415d, so that it is prevented from being rotated in a direction to separate from the pawl member 151.

As has been described above, according to the present invention, the necessity of separately storing and managing the storing tray fixing holders and the fusion splicers can be omitted. Thus, the accessory storing space can be decreased, and an operation of storing and managing the accessories and the like can be facilitated and simplified, which is a remarkable effect. Also, the operation of storing ad protecting the fusion-spliced optical fibers can be easily performed, which is an advantageous effect. Furthermore, it is easily expected to simplify the preparation of equipment necessary in splicing optical fibers.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 59054/1994 filed on Mar. 29, 1994 is hereby incorporated by reference.

What is claimed is:

1. An apparatus for splicing optical fibers, comprising:

(a) an installation table for arranging the optical fibers thereon in order to splice the optical fibers;

(b) a cover member which can be arranged in first and second positions, wherein when said cover member is arranged in said first position, said cover member covers said installation table; and (c) a gripping mechanism, attached to said cover member, wherein said gripping mechanism can grip a tray when said cover member is arranged in said second position, said tray containing the optical fibers.

2. An apparatus according to claim 1, further comprising:

(d) an image sensor for observing the optical fibers placed on said installation table;

(e) a housing for storing said image sensor; and (f) a display for displaying an output from said image sensor.

3. An apparatus according to claim 1, further comprising:

(d) an image sensor for observing the optical fibers placed on said installation table;

(e) a housing for storing said image sensor;

(f) a display for displaying an output from said image sensor; and (g) a heater attached to said housing such that said installation table is arranged between said display and said heater.

4. An apparatus according to claim 1, further comprising:

(d) an image sensor for observing the optical fibers placed on said installation table;

(e) a housing for storing said image sensor;

(f) a display for displaying an output from said image sensor; and (g) a projecting member attached to said housing, wherein said cover member has a hole to fit on said projecting member, so that said cover member is attached to said housing.

5. An apparatus according to claim 4, wherein said projecting member is a bolt.

6. An apparatus according to claim 1, further comprising:

(d) an image sensor for observing the optical fibers placed on said installation table;

(e) a housing for storing said image sensor;

(f) a display for displaying an output from said image sensor;

(g) a heater attached to said housing such that said installation table is arranged between said display and said heater; and (h) a projecting member attached to said heater, having a portion, wherein said cover member has a hole having such a size that said portion of projecting member fits on said hole of said cover member.

7. An apparatus according to claim 6, wherein said portion of said projecting member is a head of a bolt.

8. An apparatus according to claim 6, wherein said heater has a rubber member which is brought into contact with said cover member to support said cover member when said portion of said projecting member is fitted in said hole of said cover member.

9. An apparatus according to claim 1, further comprising:

(d) an image sensor for observing the optical fibers placed on said installation table;

(e) a housing, having first and second surfaces opposing each other, for storing said image sensor;

(f) a display for displaying an output from said image sensor;

(g) a heater mounted to said second surface of said housing;

(h) a handle mounted to said first surface of said housing; and (i) a rubber member mounted to said second surface of said housing.

10. An apparatus according to claim 1, further comprising:

a housing having an installation surface in a vicinity where said installation table is arranged, a bottom surface opposite to said installation surface, a front surface intersecting said installation surface at an obtuse angle, and a rear surface opposite to said front surface; and a display mounted to said front surface of said housing, wherein said cover member is bent along said installation surface and said front surface, when said installation table and said display are covered with said cover member, said installation table and said display are protected by said cover member, when said cover member is arranged near said rear surface of said housing, said cover member has a gripping surface intersecting said installation surface at an obtuse angle, and said gripping mechanism is mounted to said gripping surface, so that the optical fibers arranged on said installation table are easily moved into said tray arranged in said gripping mechanism.

11. An apparatus according to claim 1 further comprising:

a housing having an installation surface in a vicinity where said installation table is arranged, a bottom surface opposite to said installation surface, a front surface intersecting said installation surface at an obtuse angle, and a rear surface opposite to said front surface; and a display mounted to said front surface of said housing, wherein said cover member is bent along said installation surface and said front surface.

12. An apparatus for splicing optical fibers, comprising:

an installation table for placing the optical fibers thereon;

a housing having an installation surface in a vicinity where said installation table is arranged, a front surface intersecting said installation surface at an obtuse angle, and a back surface opposing to said front surface;

an image sensor for observing the optical fibers placed on said installation table, being arranged in said housing;

a display mounted to said front surface of said housing, for displaying output from said image sensor;

a cover member bending along said installation surface and said front surface, said cover member being detachable from said housing; and a gripping mechanism which can grip a tray which contains the optical fibers therein, being attached to said cover member, wherein said cover member is attachable to said back surface, and when said cover member is attached to said back surface, said tray can be gripped in a position on said cover member above said installation table, and said tray, said installation table and said display are aligned.

13. An apparatus for splicing optical fibers, comprising:

(a) an installation table for arranging the optical fibers thereon in order to splice the optical fibers;

(b) a cover member movable relative to said installation table; and (c) a gripping mechanism which can grip a tray which contains the optical fibers therein, being attached to said cover member, wherein said cover member is attachable to an outer surface of said apparatus, and when said cover member is attached to said surface, said tray can be gripped in a position on said cover member above said installation table.

14. An apparatus according to claim 13, further comprising:
(d) a housing to which said cover member is detachably mounted; and
(f) a display, mounted to said housing, for displaying an image of the optical fibers.

15. An apparatus according to claim 13, wherein when said apparatus is to be used, said cover member is mounted to a rear side, when seen from an operator, of said apparatus.

16. An apparatus for splicing optical fibers, comprising:
(a) a housing;
(b) a mechanism, provided in said housing, for splicing the optical fibers;
(c) a cover member movable relative to said mechanism, wherein said cover member can cover said mechanism; and
(d) a gripping mechanism attached to said cover member for gripping a tray which contains the optical fibers.

17. An apparatus for splicing optical fibers, comprising:
(a) an installation table for arranging the optical fibers thereon in order to splice the optical fibers;
(b) a cover member for covering said installation table;
(c) a gripping mechanism, attached to said cover member, for gripping a storing component that stores the optical fibers;
(d) an image sensor for observing the optical fibers placed on said installation table;
(e) a housing, having first and second surfaces opposing each other, for storing said image sensor;
(f) a display for displaying output from said image sensor;
(g) a heater mounted to said second surface of said housing;
(h) a handle mounted to said first surface of said housing; and
(i) a rubber member mounted to said second surface of said housing,
wherein if said handle is held when said heater is removed from said housing, said rubber member is brought into contact with a place where said apparatus is installed, thereby protecting this apparatus, and
when said heater is mounted to said housing, said rubber member is brought into contact with said heater to apply a stress to said heater, thereby firmly supporting said heater.

18. An apparatus for splicing optical fibers, comprising:
(a) an image sensor for observing the optical fibers;
(b) a housing, having first and second surfaces opposing each other, for storing said image sensor;
(c) a display for displaying output from said image sensor;
(d) a heater mounted to said second surface of said housing;
(e) a handle mounted to said first surface of said housing; and
(f) a rubber member mounted to said second surface of said housing,
wherein if said handle is held when said heater is removed from said housing, said rubber member is brought into contact with a place where said apparatus is installed, thereby protecting this apparatus, and when said heater is mounted to said housing, said rubber member is brought into contact with said heater to apply a stress to said heater, thereby firmly supporting said heater.

19. An apparatus for splicing optical fibers, comprising:
(A) an installation table for arranging the optical fibers thereon in order to splice the optical fibers;
(B) a cover member for covering said installation table;
(C) a gripping mechanism, attached to said cover member, for gripping a storing component that stores the optical fibers, wherein said gripping mechanism comprises:
(a) a case having a guide groove in an inner surface thereof;
(b) a slide member arranged in said case and having a through hole;
(c) a shaft extending through the through hole of said slide member and slidable in the guide groove; and
(d) a first pawl member mounted to said slide member.

20. An apparatus for splicing optical fibers having a gripping mechanism for gripping a storing component that stores the optical fibers, wherein said gripping mechanism comprises:
(a) a case having a guide groove in an inner surface thereof;
(b) a slide member arranged in said case and having a through hole;
(c) a shaft extending through the through hole of said slide member and slidable in the guide groove; and
(d) a first pawl member mounted to said slide member.

21. An apparatus for splicing optical fibers, comprising:
(A) an installation table for arranging the optical fibers thereon in order to splice the optical fibers;
(B) a cover member for covering said installation table;
(C) a gripping mechanism, attached to said cover member, for gripping a storing component that stores the optical fibers, wherein said gripping mechanism comprises:
(a) a case having a guide groove in an inner surface thereof;
(b) a slide member arranged in said case and having a through hole;
(c) a shaft extending through the through hole of said slide member and slidable in the guide groove;
(d) a first pawl member mounted to said slide member; and
(e) a second pawl member connected to said slide member through a spring, wherein said storing component is gripped by said first and second pawl members.

22. An apparatus according to claim 21, wherein said first and second pawl members are arranged in said case.

23. An apparatus for splicing optical fibers having a gripping mechanism for gripping a storing component that stores the optical fibers, wherein said gripping mechanism comprises:
(a) a case having a guide groove in an inner surface thereof;
(b) a slide member arranged in said case and having a through hole;
(c) a shaft extending through the through hole of said slide member and slidable in the guide groove;
(d) a first pawl member mounted to said slide member; and
(e) a second pawl member connected to said slide member through a spring, wherein said storing component is gripped by said first and second pawl members.

* * * * *